Oct. 10, 1950   E. K. STODOLA   2,524,851
RADIO RECEIVER WITH PULSE SHARPENING SYSTEM
Filed June 24, 1943   2 Sheets-Sheet 1

INVENTOR.
EDWIN K. STODOLA
BY
William D. Hall.
ATTORNEY

Oct. 10, 1950 — E. K. STODOLA — 2,524,851

RADIO RECEIVER WITH PULSE SHARPENING SYSTEM

Filed June 24, 1943 — 2 Sheets-Sheet 2

INVENTOR.
EDWIN K. STODOLA
BY William D. Hall,
ATTORNEY

Patented Oct. 10, 1950

2,524,851

UNITED STATES PATENT OFFICE 2,524,851

RADIO RECEIVER WITH PULSE SHARPENING SYSTEM

Edwin K. Stodola, Neptune, N. J., assignor to the United States of America as represented by the Secretary of War Application June 24, 1943, Serial No. 492,015

5 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to frequency discriminating methods and circuits, and their application to modulated carrier wave systems. Systems to which this invention has been found particularly applicable are those used in connection with the pulse-echo method of object location or altitude determination.

In conventional systems of this type, short trains of wave energy, usually radio waves, are transmitted at recurring intervals. On striking a target the waves are reflected or reradiated toward their source and the observed time interval between the transmitted waves and the echoes is a measure of the distance to said target.

In order to obtain accurate definition of the sharp pulses generated in such systems it is necessary to use receivers having relatively wide band channels. The response of such channels is often appreciable for frequencies far removed from the channel actually required for transmission of the desired pulses. This feature causes considerable interference when a plurality of units operating on nearby frequencies, which are within the acceptance band of said channels, are located in the same area. Since such units are not pulsed synchronously, this gives rise to a plurality of pulse images continuously moving on the oscilloscope screen of any one unit, which obscure the desired signals, thus causing considerable difficulty in keeping track of said signals and resulting in quick fatigue of the operating personnel. It also makes possible deliberate jamming by the enemy through the use of frequency modulated or amplitude modulated signals which are within the acceptance band of the receiver channels.

It is an object of this invention to provide an improved frequency discriminating circuit which will produce an output of one type in response to currents of one frequency or in a desired frequency region and produce an output of an opposite type for frequencies on either side of said region.

A further object of the invention is to provide a circuit for developing an output of one polarity for signals in a restricted frequency band, and an output of the opposite polarity for signals on either side of said band.

Another object is the application of the circuits mentioned in the foregoing objects to a wide band pulse receiver system whereby the response of said system is conditioned by the frequency of the incoming signal. More specifically, signals of a frequency in or near the center or mean frequency region of the receiver channel will be more strongly or distinctly indicated than signals on either side of said region.

Still another object of the invention is to provide a frequency responsive network for use with a wide band receiver system, said network developing a voltage of one polarity in response to signals in or near the center frequency region of said receiver and a voltage of an opposite polarity for signals on either side of said region, and controlling the response of said system as a function of the polarity of said voltage.

In accordance with one system incorporating the invention the dual polarity output of the abovementioned frequency responsive network is applied to the deflecting electrodes of an oscilloscope, whereby signals of the desired frequency deflect the base line in one direction while undesired frequencies deflect said base line in the opposite direction.

In accordance with another system incorporating this invention all signals passing through the receiver are applied to one type of beam control electrode of the oscilloscope, usually a deflecting electrode. The incoming signals are also applied to the abovementioned frequency responsive network, the output of which is applied to another type of beam control electrode of the oscilloscope, usually the beam intensity control grid. If the output is of the polarity produced by the signals in the center frequency region of the receiver channels, said grid will be rendered more positive so that the beam brightness will be increased. Signals outside this region will produce signals of opposite polarity so that the beam will be cut-off or reduced in brightness.

For a better understanding of the invention, together with other and further objects thereof, reference is had to the following description taken in connection with the accompanying drawings, wherein like parts are indicated by like reference numerals, and its scope will be pointed out in the accompanying claims.

Figure 1:
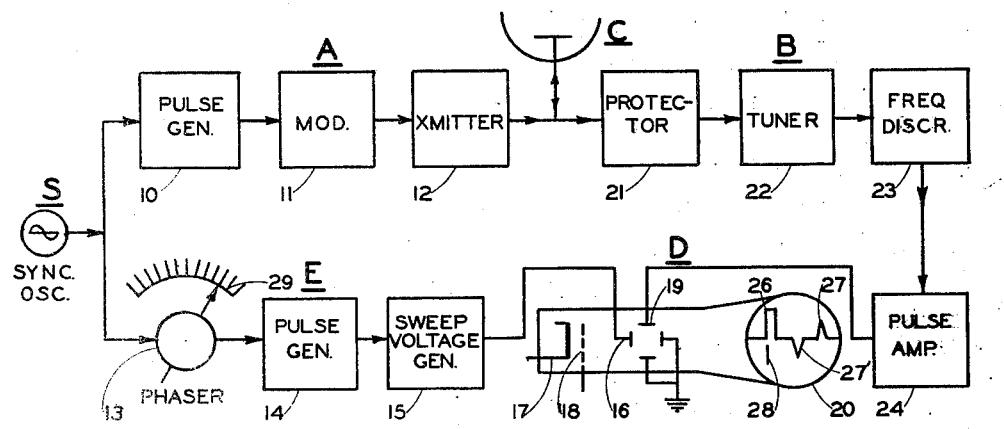
Figure 1 is a block diagram of a circuit incorporating the invention.

Reference is now made to Fig. 1, wherein one form of the invention is shown applied to an otherwise conventional type of pulse-echo system, including a transmitter channel A and receiver channel B, both coupled to a common directional antenna C, although separate antennas may be used. The output of the receiver feeds into an indicating oscilloscope D, the beam of which is periodically displaced by means of a sweep voltage from channel E. A synchronizing oscillator S synchronizes the transmitter and sweep voltage channels.

Synchronizing oscillator S delivers a sine wave, which is generally in the audio frequency region, to a pulse generator 10, which, at each cycle of voltage from oscillator S, generates a sharp voltage pulse of considerably shorter duration than said cycle. The resultant output of pulse generator 10 is a series of sharp pulses of very short duration spaced at intervals of considerably longer duration. Pulse generator 10 may be of the type which merely distorts the sine wave into a pulse of the desired shape or of the multivibrator type which is periodically keyed by the sine wave voltage, both types being well known in the art.

The pulses from generator 10 periodically key a modulator 11 which is normally biased at or near cutoff. The modulator in turn keys a normally blocked radio frequency transmitting oscillator 12, which generates trains of oscillations for the duration of each pulse.

The output of oscillator S is also applied to sweep voltage channel E comprising an adjustable phase shifter 13, pulse generator 14, and sweep generator 15. Pulse generator 14 is generally similar to pulse generator 10 and delivers sharp narrow pulses at each cycle of oscillator S. These pulses periodically keep sweep generator 15 which generates a saw tooth voltage which is in turn applied to the horizontally deflecting plates 16 of a conventional cathode ray oscilloscope indicator D. Said oscilloscope includes a cathode 17, a beam intensity control grid 18, vertically deflecting plates 19, and a fluorescent indicating screen 20. Conventional focusing electrodes and potentials therefor (not shown) are also part of said oscilloscope. By adjusting phase shifter 13, any desired point of the oscilloscope sweep can be synchronized with the pulsing of transmitter 12.

The pulses of R. F. energy from transmitter 12 are radiated through antenna C and also applied to receiver B. The energy radiated from the antenna, will upon striking an object, be reflected or reradiated back toward the antenna and impressed upon the receiver. Both the transmitted and reflected pulses appear in the receiver output and are applied to the vertically deflecting plates 19 of oscilloscope D so that they vertically deflect the oscilloscope trace. Due to the time in transit of the received pulses, the deflections due to the main transmitted pulse 26 and the reflected pulse 27 will appear separated at a distance proportional to said transit time and hence the distance to the reflecting object.

The distance of said target can be indicated by means of suitable calibrations on the screen 20 of the oscilloscope. Or, the distance can be measured by calibrating phase shifter 13 and adjusting it so that the transmitted pulse indication 26 is positioned at a given datum position 28 of the trace. The pointer is then disconnected from the phase shifter, reset to zero position on scale 29, and then reconnected to the phase shifter so that zero scale reading represents the datum position. The phase shifter is then readjusted until the received pulse indication 27 is moved to the same datum position. The transit time of the reflected signal can then be determined by noting the new position of the pointer on the scale. Since said transit time is the equivalent of a phase shift, scale 29 can be calibrated directly in terms of distance. For further details of this method, reference is made to the application of S. H. Anderson, Serial No. 470,376, filed December 28, 1942.

The receiver channel B includes a protector 21 between the antenna and tuner 22. The protector generally consists of a spark gap network which breaks down during the pulse transmission, because of the relatively large amplitude of the transmitted pulse, and greatly reduces the signal input to the receiver. When the transmission ceases, the gap recovers and permits the relatively weak reflected signal to pass to the receiver with a minimum of loss. Such networks are well known and do not per se form any part of this invention.

Tuner 22, tuned to the received signal is generally of the superheterodne type but it may be of straight tuned R. F. type. The output of the tuner may then be detected and the resulting pulse amplified and applied to the oscilloscope.

As thus far described, the system is conventional. For reasons above set forth the receiver channels must be broadly tuned to avoid pulse distortion and hence interfering signal frequencies closely adjacent to the desired frequency get through the receiver.

In accordance with one form of the present invention, the output of tuner 22 is passed through a detector 23 of the frequency discriminating type whereby desired signal frequencies yield an output of one polarity, and frequencies outside the desired range yield an output of an opposite polarity. This output is amplified by pulse amplifier 24 and applied to the deflecting plates of an oscilloscope, so that desired signal frequencies appear above the base line of the oscilloscope, while undesired frequencies appear below the base line, as indicated by 27' on the oscilloscope screen.

Figure 2:
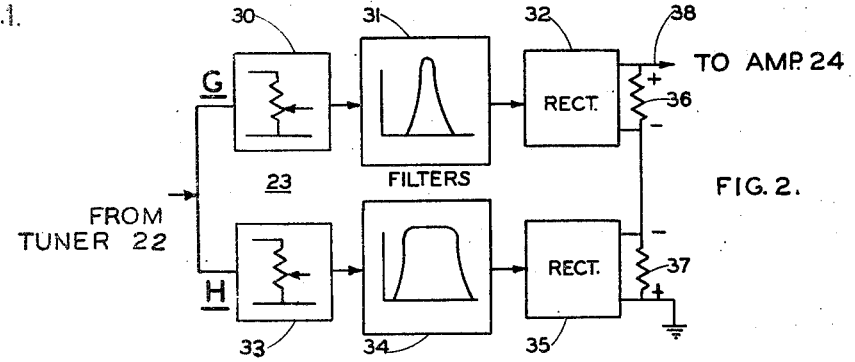
Figure 2 is a block diagram of one form of the invention.

For a more detailed description of the frequency responsive detector or discriminator 23, reference is made to Fig. 2. The output of tuner 22 is passed through two channels G and H. Channel G includes an adjustable attenuator 30, a filter 31, and rectifier 32. Channel H includes an adjustable attenuator 33, a filter 34, and rectifier 35. The components of both channels are alike with the exception of the filters. Filters 31 and 34 are both tuned to the mean or center frequency of the tuner 22, said frequency being the desired intermediate frequency in the case of a superheterodyne receiver. Filter 31 has, however, a narrower pass-band than filter 34, as indicated by the resonance curves thereon. The pass-band of filter 34 is about the same as that of the receiver tuner 22 so that it will pass the entire spectrum in the receiver output while the pass-band of filter 31 is as narrow as desired, depending upon the frequency range at which response is desired. The rectified outputs across load resistors 36 and 37 are combined in phase opposition. The time constant of rectifiers 32 and 35 must be sufficiently small to follow the pulse envelope.

Figure 3:
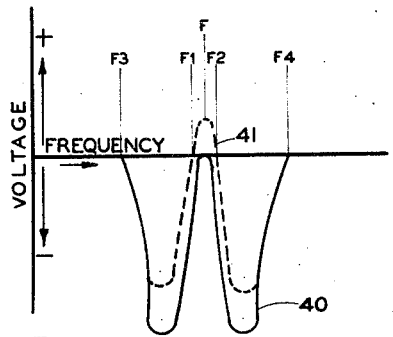
Figure 3 is a graph illustrating the operation of the circuit in Figure 2.

The resultant output between lead 38 and ground is therefore the difference between the outputs of both channels and is represented by the curves shown in Fig. 3, wherein the abscissa indicates variation in frequency of the input potentials and the ordinate indicates polarity and magnitude of the resultant voltage. Line F represents the center frequency of tuner 22 and filters 31 and 34. Lines F1 and F2 represent the band-pass near the peak of the resonance curve of filter 31 while F3 and F4 represent the band-pass of tuner 22 and filter 34.

By adjusting attenuators 30 and 33 so that the outputs across resistors 36 and 37 are equal at the center frequency F, the resultant output will be as shown by the solid curve 40. This curve shows that at the center frequency F and within a restricted frequency range F1 and F2 on either side of the center frequency the resultant output is substantially zero or minimum. By adjusting the attenuators so that the potential across resistor 36, at the center frequency F, is greater than that across resistor 37, the resultant potential, as shown by curve 41 is positive between the narrow limits F1 and F2, where the desired signal frequency is located, and negative up to limits F3 and F4, where interfering signal frequencies are located. Such resultant potentials in the output of detector network 23 are amplified at 24, and applied to the vertically deflecting electrodes of the oscilloscope. Thus signals in the region between F1 and F2 will appear above the base line of the oscilloscope while the undesired signal frequencies would appear below the base line. This helps to eliminate the confusion caused by the continuously moving interfering signals.

Although the resultant output of the frequency discriminator circuit in Fig. 2 is positive for the center frequency region and negative for signals outside the region, the reverse polarity relation can be obtained by reversing the polarity of the rectifier elements in networks 32 and 35. Furthermore, no matter what polarities of the resultant voltages are applied to the input of pulse amplifier 24, the polarities in the output of the pulse amplifier will depend upon the number of amplifier stages. Thus if the resultant voltage output of detector 23 is positive for desired signal frequencies, the polarity of the output of amplifier 24 will be negative if an odd number of stages is used.

The interference reducing qualities of the system shown in Figs. 1 and 2 depend upon the sharpness of response of the narrow band filter 31. To get a maximum of interference reduction, filter 31 should be as selective as possible, consistent with requirements of the side band components of the pulse modulation.

Figure 4:
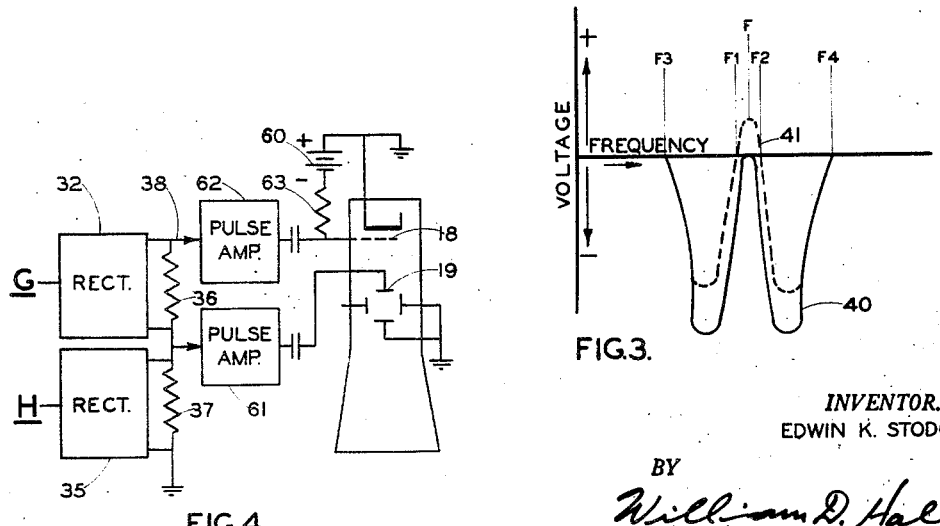
Figures 4 and 5 are circuits, partially schematic and partially in block diagram form, of other systems incorporating the invention.

Another method of using the frequency discriminator is illustrated in Fig. 4. This circuit shows the output portion of the circuit in Fig. 2, rectifiers 32, 35 and their load resistors 36, 37 representing the corresponding parts of Fig. 2.

The oscilloscope intensity grid 18 is normally biased by a negative potential from source 60 through a high resistance 63, this bias being, however, insufficient to completely suppress the beam. The voltage across resistor 37, which is derived from all signals which pass through broad band filter 34, is amplified at 61 and applied to the deflecting plates of the oscilloscope. Since filter 34 has a band pass as wide as the tuner channel, all signals will pass through with a minimum of distortion.

The resultant output of both resistors 36 and 37 is amplified at 62 and impressed upon intensity grid 18. It will be recalled that if attenuators 30 and 33 are so adjusted that the voltages across resistors 36 and 37 are equal, then the resultant output, as shown by curve 40 in Fig. 2, is zero in the center frequency region and negative on either side of this region. As a result the signal to which the receiver is accurately tuned will not change the bias on grid 18 and the signal will be visible. However, should a signal outside the center frequency region, but within the pass-band of tuner 22 and broad band filter 34, be present, then the resultant negative potential will further increase the negative bias on grid 18 to an extent sufficient to blank or cut off the beam of the oscilloscope or at least considerably reduce the beam intensity. This mode of operation permits use of a filter 31 having a fairly narrow band pass since a reasonable amount of distortion in the blanking signal circuits is not objectionable.

The circuit in Fig. 4 is capable of still another mode of operation. By adjusting attenuators 30 and 33 (Fig. 2) so that the potential across resistor 36 is greater than that across resistor 37, the output will be positive within the region of the center frequency and negative outside this region, as shown by curve 41 in Fig. 3. As a result, the negative potential on grid 18 will be reduced for desired signal frequencies, thus brightening the image, and increased for other frequencies, thus dimming or entirely blanking the image.

Figure 5:
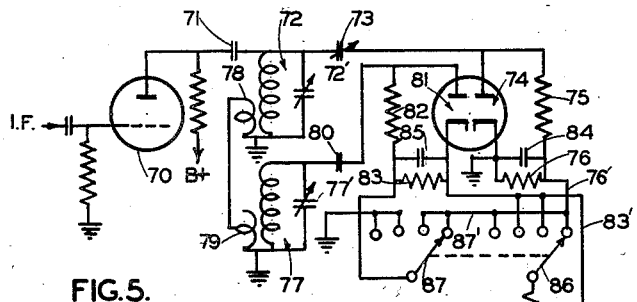

Fig. 5 shows in greater detail one type of circuit operating in accordance with the principles set forth in connection with Figs. 2 and 4. The output of the I. F. amplifier of the receiver is impressed upon the input grid of I. F. amplifier tube 70. The output of this amplifier is impressed, through a coupling condenser 71 upon a broadly tuned circuit 72 tuned to the center frequency of the I. F. amplifier. The output of tuned circuit 72 is impressed through a variable coupling condenser 73 upon a rectifier circuit including the diode section 74 connected in parallel with a high impedance load circuit including resistors 75 and 76 in series. The cathode of this diode section is grounded.

Circuit 72 is also loosely coupled to a tuned circuit 77 through a link circuit including coils 78 and 79 coupled to circuits 72 and 77 respectively. The link circuit coils may be tapped or they may be physically movable with respect to their companion coils to provide for variable coupling.

Circuit 77 is tuned to the same center frequency as circuit 72 but it has a considerably higher Q, and hence a considerably narrower pass-band than circuit 72. The output of circuit 77 is impressed, through a coupling condenser 80, upon a rectifier circuit, including diode section 81 in parallel with series connected load resistors 82 and 83. Condensers 84 and 85, connected across load resistors 76 and 83, are R. F. by-pass condensers, having a low impedance for the R. F. components of the signal but a high impedance for the detected pulse components. Hence the pulse components appear across resistors 76 and 83.

In general, both rectifier circuits are identical, i. e. resistors 75 and 82 are equal, resistors 76 and 83 are equal, and condensers 84 and 85 are equal. The output of both load circuits can be derived separately or combined for purposes hereinafter described by means of two four position switches having their movable arms mechanically tied together as indicated by the dotted lines.

With the position of the switches as shown, the potential across load resistor 76, which is developed by the R. F. voltage of broad band circuit 72, is impressed through lead 76', switch arm 86, resistor 88 and condenser 89 upon a resistor 90. By making the time constant of the network including resistors 88 and 90 and condenser 89 short with respect to the pulse duration, the pulse potentials across resistor 90 will faithfully follow the envelope of the voltage in circuit 72. The output of resistor 90 is amplified at 91 and impressed through coupling condenser 92 upon the vertically deflecting plates of oscilloscope D. Thus, substantially all signals which pass through broad band circuit 72 develop beam deflecting potentials. It is possible also to use as beam deflecting potentials the voltage across resistor 83 which is developed by the output of narrow band circuit 77.

The potential across resistor 76 is also combined in phase opposition to the voltage across resistor 83, in a circuit extending from ground, resistor 76, leads 76' and 87', switch arm 87, resistor 83 and lead 83'.

Figure 6:
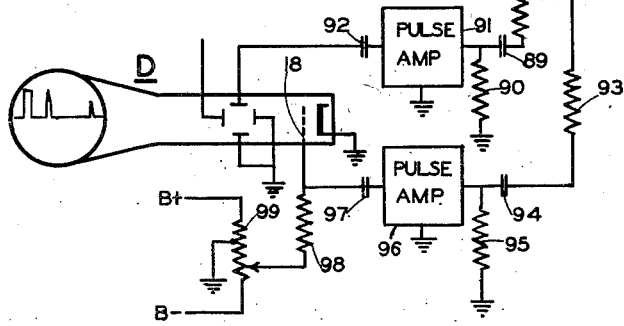
Figure 6 is a graph illustrating the operation of the frequency discriminator of the circuit in Figure 5.
Figure 6:
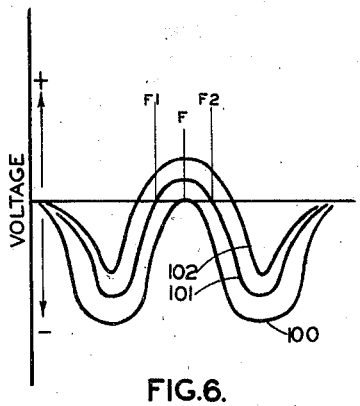

The potential between lead 83' and ground is illustrated by the curves in Figure 6. These curves indicate the variation in potential with frequency for different ratios of potential drops across resistors 76 and 83. It will be seen that these curves are generally similar to those in Fig. 3.

Curve 100 shows the voltage variation when the voltages across resistors 76 and 83 are equal at the center frequency F. Such equality can be obtained by adjusting the coupling condenser 73. Curve 100 shows that at center frequency F the output voltage is zero and at other frequencies within the pass-band of the broad band circuit 72, the voltage is negative. If condenser 73 is adjusted so that the voltage across resistor 83 is greater at the center frequency F than that across resistor 76, then the voltage will vary as shown in curves 101 or 102, depending on the adjustment of condenser 73. These curves show that in the region between F1 and F2, the width of which depends on the selectivity of circuit 77, the voltage is positive, while outside this region it is negative.

The output voltage from lead 83' is impressed, through resistor 93 and coupling condenser 94, upon resistor 95, amplified at 96, and impressed, through coupling condenser 97, upon the intensity control grid 18 of oscilloscope D. This grid is normally biased negatively by means of a variable negative potential from potentiometer 99 applied to said grid through a high resistance 98.

The bias on grid 18 is insufficient to block the beam. If the circuits are so adjusted that the response is as shown by curve 100, then the blanking voltage impressed on grid 18 will be a minimum for signals of frequency F or in the vicinity thereof. Hence the deflecting voltage developed at resistor 76 will deflect the beam to indicate the signal. If an interfering signal in the region outside the vicinity of frequency F is present, then the negative voltage impressed on grid 18 will be increased to an extent sufficient to suppress the beam or greatly reduce the brightness thereof.

If the circuits are adjusted so that the response is as shown by curve 101 or 102 then the signal applied to grid 18 will be positive for signals between F1 and F2 so that the beam brightness will be increased. For signals outside this region the signal applied to said grid will be more negative so that the beam will be cut off or greatly reduced in brightness.

The time constant of the network including condenser 94 and resistors 93 and 95 should preferably be slightly longer than that in the deflection channel so that the beam intensity control voltage applied to grid 18 should be of sufficient magnitude and duration to be effective for at least the entire duration of the beam deflecting voltage.

Switches 86 and 87 can operate in four different positions, the one shown being the operating position. The other three positions are used for aligning the circuits of the frequency discriminating network. For this purpose a pulse modulated variable frequency signal generator is connected to the input circuit of amplifier 70 and the output of amplifier 91 is applied to the vertical plates of a test oscilloscope. The frequency of the signal generator should be adjusted to the exact center frequency to which the I. F. amplifier of the receiver is tuned, which represents frequency F in Fig. 6.

The first step is to adjust the switches to their extreme counterclockwise position. This connects the output across resistor 76 to pulse amplifier 91 through lead 76' and switch 86. Trimmer condenser 72' is now adjusted until a maximum signal is obtained on the test oscilloscope.

The second step is to move the switches clockwise to their second position. This connects the output of resistor 83 to the test oscilloscope. Trimmer condensers 72' and 77' are now adjusted for maximum signal indication on the test oscilloscope.

The third step is to move the switches clockwise to their third position. This connects the combined output of resistors 76 and 83 to the test oscilloscope for comparison with the previously indicated individual outputs.

The fourth step is to move the switches to the extreme clockwise position, which is the normal operating position. The test oscilloscope is now disconnected from the output of amplifier 91 and connected to the output of amplifier 96. This setting applies the outputs of resistors 76 and 83 in phase opposition to the vertical plates of the test oscilloscope. Coupling condenser 73 is now adjusted until a small output appears above the base line of the test oscilloscope. Since adjustment of condenser 73 might detune circuit 72, the second step should now be repeated. The frequency of the test signal generator should now be slowly varied from a point substantially below frequency F3 (Fig. 6) to a point substantially above F4. As the frequency is varied the amplitude of the signal on the test oscilloscope should vary in a manner indicated by curve 101 or 102 in Fig. 6. The extent of deflection below the base line should be much greater than the deflection above the base line. If this condition is not obtained, the fourth step should be repeated with a slightly different setting of coupling condenser 73.

Terminals or plugs and jacks (not shown) can be provided in the circuit for convenience in connecting the signal generator and test oscilloscope.

In one discriminator circuit such as shown in Fig. 5, the following circuit constants were found suitable: Condenser 73 is variable through a range of 3 to 20 mfd. Condenser 80 is 5 mmf. Condensers 76 and 83 are each 10 mmf. Condensers 84 and 85 are 10 mmf. Resistors 75 and 82 are each 10,000 ohms. Resistors 76 and 83 are each 15,000 ohms. The constants of circuits 72 and 77 are such that they resonate at the intermediate frequency. It should be distinctly understood, however, that values other than those given may also be used, since they are not critical and can be changed to meet any given design factors.

Figure 7:
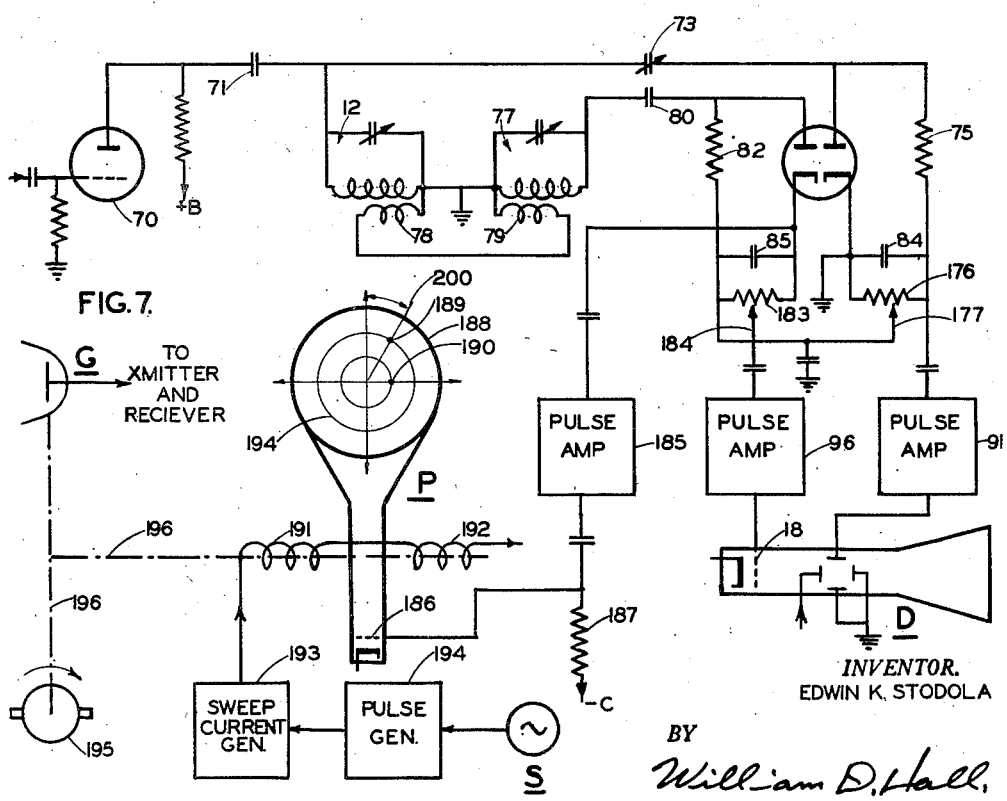
Figure 7 is a schematic diagram of still another circuit incorporating the invention.

Reference is now made to Figure 7 which shows a still further extension of the use of the frequency discriminating networks above discussed. This figure incorporates, in addition to the oscilloscope D, a plan position indicating oscilloscope P for giving a continuous indication of the direction and distance of all reflecting objects present. The remainder of the circuit is substantially the same as Fig. 6, the main difference being the use of variable potentiometers 176 and 183 as diode load resistors. This permits, if desired use of a fixed coupling condenser 73, since adjustment of the combined voltages can be accomplished solely by means of said potentiometers. For clarity, test switches 86 and 87 have also been omitted.

Use of the variable potentiometers permit more flexible control of the combined voltages used for beam intensity control. The entire output across resistor 176 is amplified at 91 and applied as a beam deflecting voltage to oscilloscope D. A portion of the voltage across resistor 176 is tapped off by slider 177 and combined in opposition with the portion of the output of resistor 183 tapped off by slider 184. This combined voltage is amplified at 96 and applied to the intensity grid 18 of oscilloscope D. The operation of this portion of the circuit is exactly the same as that of Fig. 5.

The voltage across resistor 183 is combined in opposition with the voltage tapped off by slider 177. This combined voltage is amplified at 185 and applied to intensity control grid 186 of oscilloscope P. This grid is normally biased at or near cutoff by a negative voltage applied through resistor 187, said bias being sufficient to block the beam or permit a very small beam current so that a dim trace is visible upon the screen 188 of the oscilloscope. Since the signal output of amplifier 185 has a characteristic such as shown by curves 101 or 102 in Fig. 6, a signal of the desired frequency will decrease the negative bias so that a bright spot 189 or 190 will appear on the screen. Undesired signal frequencies will render grid 186 more negative and still further reduce the intensity of, or entirely cut off, the beam. Signal indication in this case is accomplished by intensity grid modulation alone rather than by beam deflection or a combination of the two as is the case with oscilloscope D.

The beam is continuously radially deflected from the center of the screen 188 toward the periphery thereof by deflecting magnets 191 and 192 which are energized by the output of a saw-tooth current generator 193 which is in turn controlled by synchronizing oscillator S (Figs. 1 and 7). This oscillator periodically keys a pulse generator 194, similar to 14 in Fig. 1, said generator in turn keying saw-tooth current generator 193.

Because of this radial deflection, the distance of a spot, such as 189 or 190, from the center of the screen is a measure of the distance of the reflecting object. The screen of oscilloscope P is therefore graduated with distance indicating circles 194.

Means is also provided for rotation of the plane of beam deflection in synchronism with rotation of directional antenna C. This is done by means of a motor which continuously rotates the yoke of beam deflecting magnets 191 and 192 around the axis of the tube, and synchronously therewith rotates antenna C to change the direction of radiation thereof. This synchronous rotation is indicated by the dot-dash line which represents either direct mechanical connection or equivalent servo-motor means.

In this manner the plane of beam deflection is at all times synchronized with the direction in which the antenna is effective so that the angle of the radial line 200 through the spot 189 with respect to a fixed direction is an indication of the azimuth of the reflecting object.

To provide for continuous indication of all reflecting objects or targets, the minimum speed of rotation of the antenna and magnet yoke, i. e. the speed of scanning, must be consistent with the persistence of the screen of oscilloscope P. High persistence screens permit speeds as low as 5 R. P. M.

Rotation of the beam deflection plane can be accomplished by means other than the use of a rotating magnet yoke. For instance, rotating electric or magnetic fields can also be obtained by static methods. For this purpose a Selsyn generator (not shown) driven in synchronism with the antenna, can be used to develop two currents, phase displaced ninety degrees with respect to each other. Both currents are then mixed with the output of sweep current generator 193. One of the mixed currents is then applied to one pair of stationary deflecting magnets and the other mixed current is applied to a second pair of stationary deflecting magnets, one pair deflecting the beam in plane perpendicular to the plane of deflection of the other pair. This creates a rotating magnetic field which rotates the beam. For a more detailed showing of one such beam rotating circuit reference is made to Patent No. 2,313,966, issued to W. J. Poch.

Oscilloscope P indicates positions in terms of polar coordinates. The system shown in Fig. 7 can also be used with oscilloscopes giving positions in terms of rectangular coordinates. In fact, it can be used with any known type of oscilloscope in which signals control the beam intensity.

The use of both oscilloscopes P and D is of advantage since the amplitude of the incoming signals can be more readily observed on oscilloscope D. However, the latter can be eliminated where circumstances do not require it.

The circuits in Figs. 4, 5, and 7 reduce or entirely eliminate the oscilloscope indication upon the occurrence of an interfering signal within the pass band of the receiver but outside the pass band of the narrow band filter. Under certain conditions, this will affect the reproduction of the desired signal if interfering signals are present at the same time. However, since most signals of this type are pulse modulated, the desired pulse signals will still be reproduced, unless the interfering pulses are in exact synchronism with the desired pulses; an occurrence which is extremely unlikely. If this should occur, however, it is a simple matter to change the phase or repetition rate of the desired pulses.

It should be understood that the circuits above described are not restricted for use with radio object location systems nor with the particular indicating means shown. They are equally applicable to other radio systems using intermittently modulated signals. They are also applicable to systems using other than radio waves, e. g. systems using sound waves in air or water for communication, object location, or depth sounding. In addition, the frequency discriminator circuits are equally applicable to any electrical system requiring a discrimination between frequency, e. g. frequency indicating and measuring circuits. Finally, the discriminator voltages can be applied as a bias on the tubes of the receiver channels instead of the oscilloscope. Or it may be applied to both portions of the system.

While there have been described what are at present considered preferred embodiments of the invention, it will be obvious to those skilled in the art that various changes and modifications may be made therein without departing from the invention, and it is therefore, aimed in the appended claims to cover all such changes and modifications as fall within the true spirit and scope of the invention.

I claim:

1. A superheterodyne receiver system for interrupted waves comprising an intermediate frequency channel having a relatively wide band pass, at least two tuned detector networks tuned to the center frequency of said channel and connected thereto, one of said networks having a band pass at least equal to that of said channel, the other network having a band pass narrower than said channel, an oscilloscope having a beam intensity control electrode, means to combine the outputs of both networks in opposition to produce a resultant output and means for impressing said resultant output upon said intensity control electrode.

2. A superheterodyne receiver system for interrupted waves comprising a tuned intermediate frequency channel having a relatively wide band pass, at least two tuned detector networks tuned to the center frequency of said channel and coupled thereto, one of said networks having a band pass narrower than the other, an oscilloscope having a beam intensity control electrode and at least one deflecting electrode, means to impress the output of one of said networks upon said deflecting electrode, means to combine the output of both networks in opposition to produce a resultant output, and means to impress said resultant output upon said intensity control electrode.

3. A superheterodyne receiver system for pulse modulated continuous waves comprising a tuned intermediate frequency channel having a relatively wide band pass, at least two tuned detector networks tuned to the center frequency of said channel and coupled thereto, one of said networks having a band pass at least as wide as said channel and the other network having a band pass narrower than said channel, an oscilloscope having a beam intensity control electrode and at least one deflecting electrode, means to impress the output of the broader band network upon said deflecting electrode, means to equalize the outputs of both networks at the center frequency, means to combine said outputs in opposition, and means to amplify said combined output and impress it upon said intensity control electrode in such direction as to decrease the beam intensity.

4. A frequency discriminating network comprising two circuits tuned to the same frequency, one of said circuits being more sharply tuned than the other, means to separately rectify the output of each circuit, means for combining the rectified outputs in opposition, an indicator, and switching means for individually selecting the rectified output of either circuit or said combined output and impressing the selected output on the indicator.

5. A superheterodyne receiver system for pulse modulated continuous waves comprising a tuned intermediate frequency channel having a relatively wide band pass, at least two tuned detector networks tuned to the center frequency of said channel and coupled thereto, one of said networks having a band pass at least as wide as said channel and the other network having a band pass narrower than said channel, an oscilloscope having a beam intensity control electrode and at least one deflecting electrode, means to impress the output of the broader band network upon said deflecting electrode, and means to impress the output of the narrower band network upon said intensity control electrode to vary the beam intensity.

EDWIN K. STODOLA.

REFERENCES CITED

The following references are of record in the file of this patent:

UNITED STATES PATENTS

| Number | Name | Date |
|---|---|---|
| 2,053,762 | Braden | Sept. 8, 1936 |
| 2,113,212 | Landon | Apr. 5, 1938 |
| 2,127,816 | Holst et al. | Aug. 23, 1938 |
| 2,153,780 | Van Loon | Apr. 11, 1939 |
| 2,186,867 | Jeffcock | Jan. 9, 1940 |
| 2,206,010 | Braselton | July 2, 1940 |
| 2,210,738 | Tubbs | Aug. 6, 1940 |
| 2,243,140 | Weagant | May 27, 1941 |
| 2,262,218 | Andrews | Nov. 11, 1941 |
| 2,355,363 | Christaldi | Aug. 8, 1944 |
| 2,367,907 | Wallace | Jan. 23, 1945 |
| 2,416,346 | Potter | Feb. 25, 1947 |
| 2,426,580 | O'Brien | Aug. 26, 1947 |

FOREIGN PATENTS

| Number | Country | Date |
|---|---|---|
| 337,050 | Great Britain | Oct. 27, 1930 |
| 451,227 | Great Britain | July 31, 1936 |

OTHER REFERENCES

Rider, "Cathode-Ray Tube at Work," page 172, John F. Rider Publication, 1935.